Patented Apr. 6, 1948

2,439,146

UNITED STATES PATENT OFFICE 2,439,146

LOAD WEIGHING DEVICE

Arthur C. Ruge, Cambridge, Mass., assignor to The Baldwin Locomotive Works, a corporation of Pennsylvania Application March 14, 1946, Serial No. 654,245

8 Claims. (Cl. 201—63)

This invention relates generally to load weighing devices.

It is an object of my invention to provide a relatively simple and economical load weighing device that is adapted to have a high degree of stability and ruggedness together with sensitivity and accuracy in weighing the axial component of loads regardless of substantial angular, torsional and eccentric loading effects.

Figure 1:
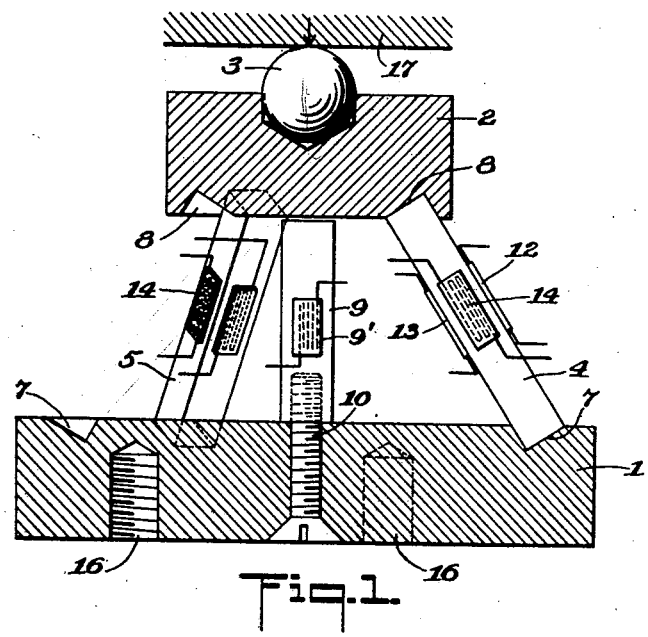
Figure 2:
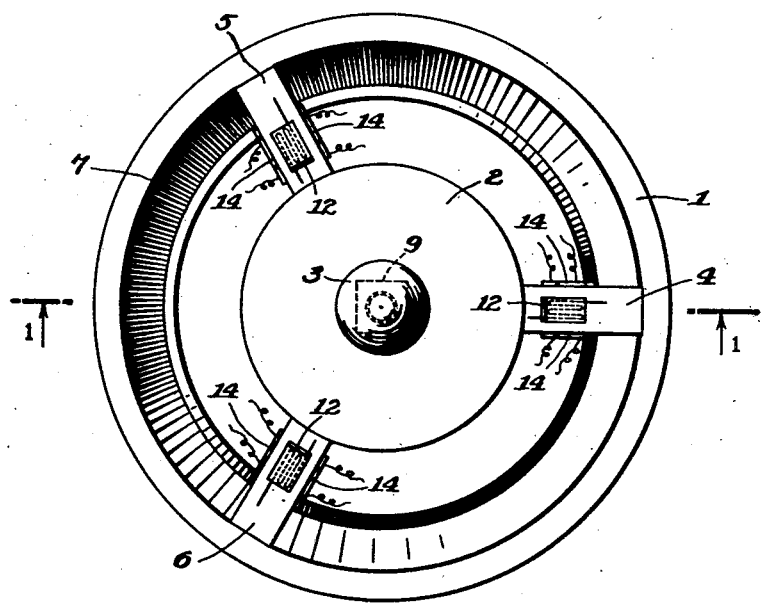

Other objects and advantages will be more apparent to those skilled in the art from the following description of the accompanying drawings in which:

Fig. 1 is a transverse section taken substantially on the line 1—1 of Fig. 2; and Fig. 2 is a plan view of Fig. 1.

In the particular embodiment of the invention, I have provided a base 1 and an upper plate or load receiving element 2 which preferably has a recess containing a ball 3 for supporting the load to be measured. A plurality of load weighing columns 4, 5 and 6 are seated at their upper and lower ends in annular V-shaped grooves 7 and 8 formed in the base 1 and plate 2. The columns are preferably three in number equally spaced circumferentially. The upper and lower ends of these columns could, of course, have contact with the base and plate in any other suitable manner such as individual recesses, but for convenience, annular grooves are preferably employed as they can be accurately and economically machined on a lathe. These columns are preferably welded or otherwise suitably secured to the base and plate. Preferably, the axes of the inclined columns are made to intersect at the point of application of the load, although this is not believed to be an essential requirement. Certain essential features are the lateral stability achieved by virtue of the inclination of the legs, and the substantial stability against eccentric load and torsion which is inherent in the construction. A usual temperature compensating dummy gage column 9 is preferably secured at its lower end to the base by a screw 18 and terminates slightly beneath the bottom of plate 2 so as to allow normal free movement thereof without transmitting load to the dummy column but at the same time allow the column to perform a safety function by engaging the plate in case of failure of the load weighing columns. Electrical impedance strain gages preferably of the bonded wire type shown in Patent 2,292,549 are used as diagrammatically indicated at 9' for temperature compensation and at 12 and 13 on opposite sides of each of the load weighing columns. If desired, instead of employing a dummy gage column 9, transverse temperature compensating dummy gages 14 may be mounted directly on the load weighing columns. The use of temperature compensating means, such as dummy column gages 9', or of transverse dummy gages 14, are broadly well-known in the art, and hence further description of their function need not be given. Base 1 may be secured to any other member, if desired, by bolts threaded in holes 16.

From the foregoing disclosure, it is seen that I have provided an extremely simple and economical and yet highly sensitive and accurate load weighing device in which the load weighing columns by being inclined from at least three different directions, preferably at the same angle, are adapted to effectively take care of angular or inclined loading arising from either compression or tension loading. Any angular or eccentric load that tends to impose a greater strain on one column than on another will be averaged through the connection of all column gages in a usual bridge circuit and hence the device as a whole will respond substantially to the true axial component of load. As regards eccentric loads, there is, however, minimum possibility of eccentric loads being transmitted from a load source 17 to the columns for the reason that ball 3 will theoretically have only a point contact with member 17. If the columns should tend to bend as a result of eccentric loading, the bending action is cancelled by reason of the gages being on opposite sides of the columns. Similarly, any torsion applied to the loading plate 2 will also be averaged out by reason of positioning of the gages so as to respond only to axial strains on the columns. In practice, a substantial cover would be provided. This is not shown for purposes of clarity.

Clearly, the load need not be carried through the ball but can be brought in directly on load plate 2 by any suitable attachment such as screws, bolts or welding. It will also be seen that by providing suitable attachment means my device will function in tension as well as compression and will retain its functional advantages.

It will of course be understood that various changes in details of construction and arrangement of parts may be made by those skilled in the art without departing from the spirit of the invention as set forth in the appended claims.

I claim:

1. A load weighing device comprising a plurality of inclined load sensitive columns at least one of which is inclined relative to another so that the applied load is carried to the base in more than one direction, means for securing said columns together at one end, means for securing the same together at their other end, and electrical impedance means secured to said columns so as to be responsive to strain therein produced by subjecting the device to a load.

2. The combination set forth in claim 1 further characterized in that the load weighing columns are three in number substantially equally spaced circumferentially.

3. The combination set forth in claim 1 further characterized in that the projected axes of the inclined columns meet substantially at a point.

4. A load weighing device comprising, in combination, a base, an upper member, a plurality of load weighing columns supported at their lower ends on said base and inclined inwardly toward each other for support on the upper member, and electrical impedance strain responsive gages mounted on said columns.

5. The combination set forth in claim 4 further characterized in that said base and member have annular grooves in which the ends of the columns are seated.

6. The combination set forth in claim 4 further characterized in that said base and member have recesses shaped to be complementary to the ends of the columns.

7. The combination set forth in claim 4 further characterized in that a dummy gage column is positioned within the spacing of said load weighing columns.

8. The combination set forth in claim 4 further characterized in that a dummy gage column is positioned within the spacing of said load weighing columns and is of a length to allow free normal movement between the base and upper member but is adapted to serve as a safety member in the event of failure of a load weighing column.

ARTHUR C. RUGE.